United States Patent
Yang (10) Patent No.: US 9,110,213 B2
(45) Date of Patent: Aug. 18, 2015

(54) STEREOSCOPIC IMAGE DISPLAY DEVICE AND METHOD OF DRIVING STEREOSCOPIC IMAGE DISPLAY DEVICE

(75) Inventor: Yingbao Yang, Kanagawa (JP)

(73) Assignee: Japan Display Inc., Tokyo (JP)

( * ) Notice: Subject to any disclaimer, the term of this patent is extended or adjusted under 35 U.S.C. 154(b) by 400 days.

(21) Appl. No.: 13/523,477

(22) Filed: Jun. 14, 2012

(65) Prior Publication Data

US 2012/0327076 A1 Dec. 27, 2012

(30) Foreign Application Priority Data

Jun. 21, 2011 (JP) .................................. 2011-137087

(51) Int. Cl.
*H04N 13/04* (2006.01)
*G03B 35/24* (2006.01)
*F21V 8/00* (2006.01)
*G02B 27/22* (2006.01)

(52) U.S. Cl.
CPC .......... *G02B 6/0076* (2013.01); *G02B 27/2214* (2013.01); *G03B 35/24* (2013.01); *H04N 13/0409* (2013.01); *H04N 13/0454* (2013.01); *G02B 6/0035* (2013.01)

(58) Field of Classification Search
None
See application file for complete search history.

(56) References Cited

U.S. PATENT DOCUMENTS

| 6,215,594 | B1 * | 4/2001 | Inoguchi et al. | 359/619 |
| 2006/0114415 | A1 * | 6/2006 | Shestak et al. | 353/7 |
| 2007/0008406 | A1 * | 1/2007 | Shestak et al. | 348/58 |
| 2007/0091058 | A1 * | 4/2007 | Nam et al. | 345/102 |
| 2008/0291152 | A1 * | 11/2008 | Nakao et al. | 345/102 |

FOREIGN PATENT DOCUMENTS

JP 2007-187823 7/2007
WO WO-2012/144471 A1 10/2012

OTHER PUBLICATIONS

Japanese Office Action issued Jul. 29, 2014 for corresponding Japanese Application No. 2011-137087.

* cited by examiner

*Primary Examiner* — Jay Patel
*Assistant Examiner* — Reza Aghevli
(74) *Attorney, Agent, or Firm* — Fishman Stewart Yamaguchi PLLC (57) ABSTRACT

A stereoscopic image display device includes: an image display unit that can display parallax images; an optical component that causes the parallax images to be recognized as a stereoscopic image; and a back light unit that is arranged on a rear face side of the image display unit, wherein the back light unit includes a first illumination section that illuminates the image display unit at a first outgoing angle at the time of displaying a planar image by using the image display unit and a second illumination section that illuminates the image display unit at a second outgoing angle, which is narrower than the first outgoing angle, at the time of displaying a stereoscopic image by using the image display unit and the optical component.

9 Claims, 6 Drawing Sheets

STEREOSCOPIC IMAGE DISPLAY DEVICE AND METHOD OF DRIVING STEREOSCOPIC IMAGE DISPLAY DEVICE

FIELD

The present disclosure relates to a stereoscopic image display device. In addition, the present disclosure relates to a method of driving a stereoscopic image display device.

BACKGROUND

There are stereoscopic image display devices that realize a stereoscopic view for an image observer observing two (or more) images (hereinafter, these may be referred to as "parallax images") having parallax. The system of the stereoscopic image display devices is largely divided into a glasses system in which parallax images are divided and input to the left and right eyes by using glasses and a naked eye system in which parallax images are input to the left and right eyes through a special optical component without using glasses.

As the stereoscopic image display devices of the naked eye system, there are stereoscopic image display devices of various types such as a parallax barrier type using a parallax barrier as the special optical component that enables stereoscopic recognition of parallax images, a lenticular lens type using a lenticular lens as the special optical component, and the like.

By using the stereoscopic image display device that realizes a stereoscopic view, in other words, displays a stereoscopic image (three-dimensional (3D) image), it is preferable that an ordinary planar image (two-dimensional (2D) image) can be also displayed without any problem. In other words, a configuration is preferable in which switching between the display of a stereoscopic image and the display of a planar image can be performed.

As a stereoscopic image display device that can switch between the display of a stereoscopic image and the display of a planar image, a mobile information terminal is generally used in which two display optical systems are arranged, and both text information and image information can be displayed so as to be easily recognized by switching between the two display optical systems (for example, see JP-A-2007-187823).

SUMMARY

However, in a stereoscopic image display device that can display both the planar image and the stereoscopic image, when a display screen of an image display unit is seen in an oblique direction, particularly, in the direction of the side face of the image display unit, although there is no problem in the visibility of the display of a planar image, the visibility of the display of a stereoscopic image is degraded due to the presence of a reverse view or the like. Here, the "reverse view" represents a state in which left and right videos are reversed (inverted), in other words, a state in which a left-eye video is seen by the right eye, and a right-eye video is seen by the left eye.

It is therefore desirable to provide a stereoscopic image display device and a method of driving the stereoscopic image display device capable of suppressing the influence of a reverse view at the time of displaying a stereoscopic image.

An embodiment of the present disclosure is directed to a stereoscopic image display device including: an image display unit that can display parallax images; an optical component that causes the parallax images to be recognized as a stereoscopic image; and a back light unit that is arranged on a rear face side of the image display unit. The back light unit includes a first illumination section that illuminates the image display unit at a first outgoing angle at the time of displaying a planar image by using the image display unit and a second illumination section that illuminates the image display unit at a second outgoing angle, which is narrower than the first outgoing angle, at the time of displaying a stereoscopic image by using the image display unit and the optical component.

Another embodiment of the present disclosure is directed to a method of driving a stereoscopic image display device including an image display unit that can display parallax images, an optical component that causes the parallax images to be recognized as a stereoscopic image, and a back light unit that is arranged on a rear face side of the image display unit. The back light unit includes a first illumination section that illuminates the image display unit at a first outgoing angle and a second illumination section that illuminates the image display unit at a second outgoing angle that is narrower than the first outgoing angle. The method includes: switching between the first illumination section and the second illumination section at the time of displaying a planar image by using the image display unit and at the time of displaying a stereoscopic image by using the image display unit and the optical component.

In the stereoscopic image display device having the above-described configuration or the method of driving the stereoscopic image display device according to the embodiments of the present disclosure, the second illumination section that is used at the time of displaying a stereoscopic image illuminates the image display unit at an outgoing angle that is narrower than the outgoing angle of the first illumination section used at the time of displaying a planar image. Accordingly, the viewing angle of the image display unit at the time of displaying a stereoscopic image is narrower than the viewing angle of the image display unit at the time of displaying a planar image. Here, the "viewing angle" represents an angle at which the displayed content can be accurately seen when the display screen of the image display unit is viewed in an oblique direction. At the time of displaying a stereoscopic image, by narrowing the viewing angle of the image display unit, an image observer views the displayed image in the angle range of the narrow viewing angle. In addition, by narrowing the angle range for viewing the display screen, the influence of a reverse view can be suppressed, compared to a case where the angle range is broad.

According to the stereoscopic image display device of the embodiment of the present disclosure or the method of driving the stereoscopic image display device of the embodiment of the present disclosure, by using the second illumination section having an outgoing angle narrower than that of the first illumination section in a case where a stereoscopic image is displayed, the viewing angle of the image display unit can be narrowed. Accordingly, the angle range for viewing the display screen at the time of displaying a stereoscopic image is narrowed, whereby the influence of the reverse view can be suppressed.

DETAILED DESCRIPTION

Hereinafter, embodiments of the present disclosure will be described with reference to the drawings. However, the present disclosure is not limited to the embodiments, but various numeric figures and materials described in the embodiments are examples. In the description presented below, the same reference numeral is used for the same elements or elements having the same function, and duplicate description thereof will not be repeated. The description will be presented in the following order.

1. Overall Description of Stereoscopic Image Display Device and Driving Method thereof According to Embodiment of Present Disclosure 2. Stereoscopic Image Display Device According to Embodiment

[Overall Description of Stereoscopic Image Display Device and Driving Method Thereof According to Embodiment of Present Disclosure]

The stereoscopic image display device according to the embodiment of the present disclosure includes an image display unit that can display parallax images (in other words, two (or more) images having a parallax), an optical component that allows an image observer to recognize the parallax images as a stereoscopic image (three-dimensional (3D) image), and a back light unit that is arranged on the rear face side of the image display unit.

As the image display unit, a general transmission-type display panel such as a liquid crystal display panel or the like can be used. The image display unit may be in correspondence with either a monochrome display or a color display.

In the stereoscopic image display device according to an embodiment, which will be described later, for example, a liquid crystal display panel corresponding to a transmission-type monochrome display is used as the image display unit. In addition, in the embodiment, the optical component that allows parallax images to be recognized as a stereoscopic image will be described as being arranged between the image display unit and an image observer.

In addition, the structure according to the embodiment of the present disclosure is not limited thereto, and a configuration may be employed in which the optical component causing parallax images to be recognized as a stereoscopic image is arranged between the transmission-type display panel and the back light unit. Furthermore, a liquid crystal display panel of a semi-transmission type may be used as the image display unit.

The image display unit can display not only parallax images but also an ordinary planar image (two-dimensional (2D) image). When the image display unit displays a planar image, by not allowing the optical component causing parallax images to be recognized as a stereoscopic image to achieve the function, the image observer can directly observe a display image displayed on the image display unit as a planar image.

On the other hand, when the image display unit displays parallax images, by allowing the optical component causing parallax images to be recognized as a stereoscopic image to achieve the function, the image observer can observe the parallax images as a stereoscopic image. In other words, the display of a stereoscopic image is realized by a combination of the image display unit and the optical component, in other words, a stereoscopic view of parallax images displayed by the image display unit for an image observer is realized by an action of the optical component interposed in the optical path between the image display unit and the image observer.

The back light unit is configured by two illumination sections, that is, a first illumination section and a second illumination section and is a surface light source device that illuminates the image display unit from the rear face side. The first illumination section illuminates the image display unit at a first outgoing angle from the rear face side. Here, the "rear face side" represents a face side of the image display unit opposite to a display face on which an image is displayed. The configuration of the first illumination section is not particularly limited. As the first illumination section, a general illumination device that emits light at a wide outgoing angle (first outgoing angle) can be used. Here, the "wide outgoing angle" represents an outgoing angle at which the entire rear face of the image display unit can be illuminated.

On the other hand, the second illumination section illuminates the image display unit from the rear face side at a second outgoing angle that is narrower than the first outgoing angle. In addition, the configuration of the second illumination section is not particularly limited. As the second illumination section, a general illumination device that emits light at a narrow outgoing angle can be used. Here, the "narrow outgoing angle" represents an outgoing angle that is narrower than the outgoing angle of the first illumination section, and more particularly, the outgoing angle in the crosswise direction (the arranging direction of a pixel row/the horizontal direction) of the display screen.

As an example, the first and second illumination sections of the back light unit can be configured by using two light guiding plates. In one light guiding plate, a scattering member such as diffusive reflective dots, a prism, or the like is arranged so as to be configured as the first illumination section. In the first illumination section, when light emitted from a light source is incident on the light guiding plate, the light is scattered by the action of the scattering member such as the dots, a prism, or the like so as to be output as light having a broad angle distribution. In the other light guiding plate, a mechanism such as a prism is arranged so as to be configured as the second illumination section. In the second illumination section, when light emitted from a light source is incident on the light guiding plate, the light passes through a mechanism such as the prism or the like so as to be output as light having a narrow angle distribution.

It is preferable to switch between the first illumination section and the second illumination section to be used in accordance with an image display mode of the planar image display and the stereoscopic image display. However, it is not excluded to simultaneously use the first illumination section and the second illumination section together. For example, when the first illumination section having the broad first outgoing angle is used, the second illumination section having the second outgoing angle that is included in the angle range of the first outgoing angle may be used simultaneously.

The first illumination section may be used in a case where a planar image is displayed not through the optical component in the optical path between the image display unit and the image observer. Here, "not through" represents a state in which the optical component causing parallax images to be recognized as a stereoscopic image does not achieve the function. Even a case where the optical component is actually present in the optical path is included in the concept of "not through" when the optical component is in the state not achieving the function (the function of causing parallax images to be recognized as a stereoscopic image).

The second illumination section may be used in a case where a stereoscopic image is displayed through the optical component that is in the optical path. The second illumination section illuminates the image display unit at an outgoing angle narrower than the outgoing angle of the first illumination section. Here, "through" represents a state in which the optical component causing parallax images to be recognized as a stereoscopic image achieves the function.

By using the second illumination section having an outgoing angle narrower than that of the first illumination section, the viewing angle of the image display unit at the time of displaying a stereoscopic image is narrower than that of the image display unit at the time of displaying a planar image. As the viewing angle of the image display unit is narrowed at the time of displaying a stereoscopic image, an image observer views (observes) a display image within the angle range of the narrow viewing angle. Thus, as the angle range in which a display screen is viewed is narrowed, the influence of the reverse view can be suppressed, compared to a case where the angle range is broad, whereby the visibility can be improved.

In addition, the light intensity when the image display unit is illuminated by the second illumination section at the time of displaying a stereoscopic image is stronger than the light intensity when the image display unit is illuminated by the first illumination section at the time of displaying a planar image by an amount corresponding to the degree of the narrowness of the outgoing angle. In other words, by narrowing the outgoing angle, the light intensity of illumination for the image display unit at the time of displaying a stereoscopic image can be increased. Accordingly, by using the second illumination section in a case where a stereoscopic image is displayed, even when the optical component enabling stereoscopic recognition of parallax images is present in the optical path, a luminance level that is higher than that of a case where only the first illumination section is used can be acquired.

In the stereoscopic image display device according to the embodiment of the present disclosure, the optical component that causes parallax images to be recognized as a stereoscopic image is not particularly limited. As examples of the optical component, there are a parallax barrier, a lenticular lens, and the like.

In the parallax barrier, almost a half of the display surface serves as a light shielding portion (screening portion), and accordingly, the luminance may easily decrease compared to the case of a lenticular lens. Accordingly, in the stereoscopic image display device using a parallax barrier as the optical component causing parallax images to be recognized as a stereoscopic image, it is preferable to use a back light unit having the above-described configuration as the back light unit in which switching between the first illumination section or the second illumination section is performed.

The positional relationship of the first illumination section and the second illumination section with respect the image display unit is not particularly limited. From the viewpoint of effectively utilizing the narrow outgoing angle of the second illumination section at the time of displaying a stereoscopic image, it is preferable that the second illumination section is arranged further on the front side (the image display unit side) than the first illumination section with respect to the image display unit.

It is preferable that the switching from the first illumination section to the second illumination section or the switching from the second illumination section to the first illumination section is slowly performed over a predetermined time after the switching from the display of a planar image to the display of a stereoscopic image or the switching from the display of a stereoscopic image to the display of a planar image. The predetermined time is preferably a time corresponding to a predetermined number of frames, for example, about 3 to 4 frames. Here, a "frame" represents a unit (one frame=one image) that configures an image (video).

A driving circuit that drives the image display unit and a driving circuit that drives a parallax barrier of the liquid crystal type may be configured by various circuits. The driving circuits can be configured by using general circuit elements or the like.

Various conditions represented in the description presented here are applied not only in a case where the conditions are strictly satisfied but also a case where the conditions are substantially satisfied. In other words, the presence of various deviations occurring in the design or manufacturing process is allowed.

[Stereoscopic Image Display Device According to Embodiment]

Hereinafter, a stereoscopic image display device that uses a parallax barrier as the optical component causing parallax images to be recognized as a stereoscopic image will be described as a stereoscopic image display device according to an embodiment.

Figure 1:
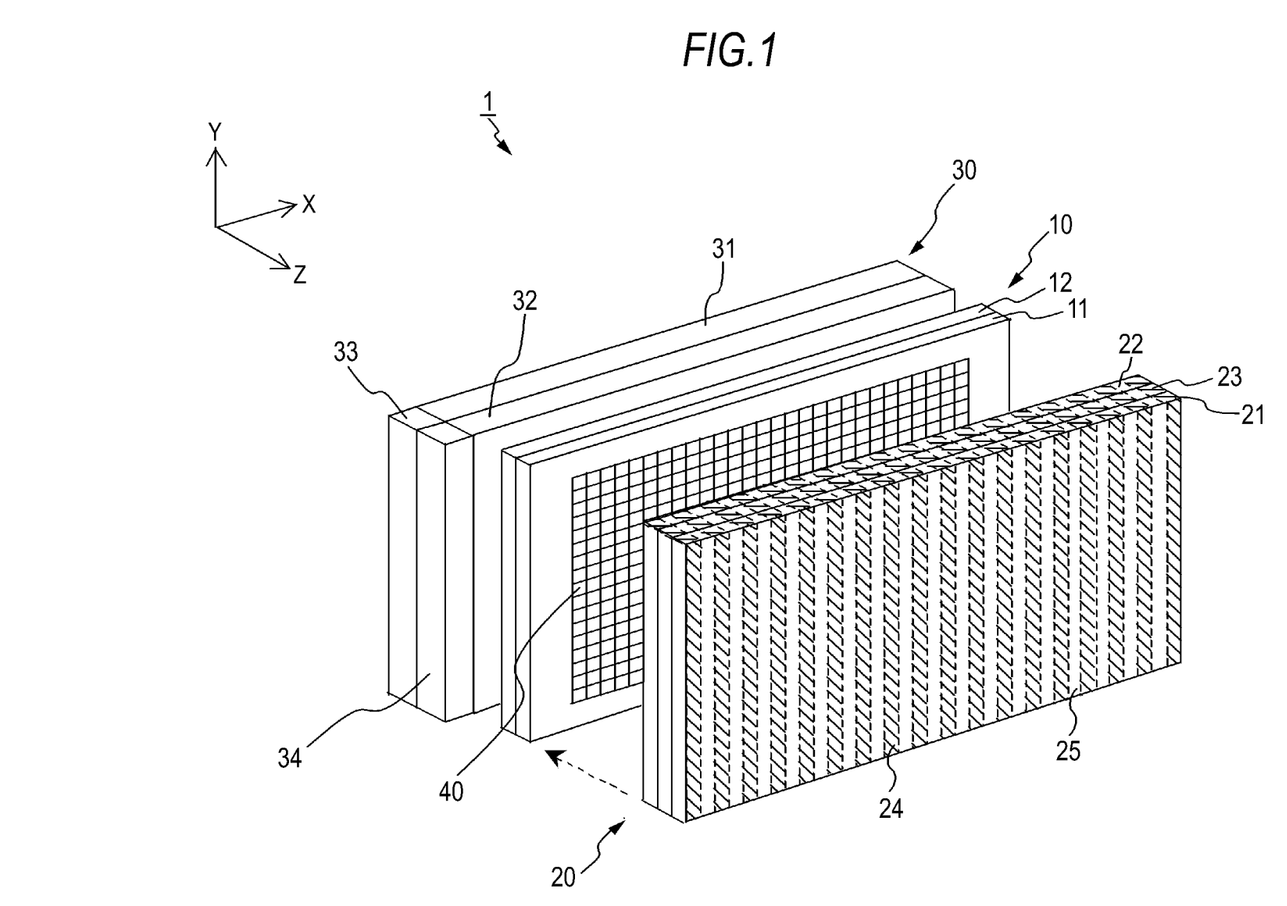
FIG. 1 is a schematic perspective view of a stereoscopic image display device according to an embodiment when it is virtually divided.

FIG. 1 is a schematic perspective view of the stereoscopic image display device according to the embodiment when it is virtually divided.

As illustrated in FIG. 1, the stereoscopic image display device 1 according to the embodiment includes an image display unit 10 that can display parallax images, a parallax barrier 20 that is an optical component causing parallax images to be recognized as a stereoscopic image, and a back light unit 30 that is arranged on the rear face side of the image display unit 10.

The image display unit 10, for example, is formed by a liquid crystal display panel. The liquid crystal display panel, for example, is formed by a front panel 11, a rear panel 12, and a liquid crystal material (not illustrated in the figure) that is arranged between the front panel 11 and the rear panel 12. The front panel 11 includes a transparent common electrode that is disposed to be common to all the pixels. In the rear panel 12, pixels 40 are arranged in a two-dimensional matrix pattern. The rear panel 12 includes transparent pixel electrodes disposed for each pixel 40.

The operation mode of the liquid crystal display panel is not particularly limited. The liquid crystal display panel may be configured so as to be driven in a so-called TN mode or may be configured so as to be driven in a VA mode, an IPS mode, or the like.

As the parallax barriers 20, there are a variable barrier in which a barrier (light shielding portion) is selectively formed and a fixed barrier in which a barrier is fixedly formed. The variable barrier achieves the function of causing parallax images to be recognized as a stereoscopic image in a state in which the barrier is formed and does not achieve the function in a state in which the barrier is not formed. Accordingly, when a planar image is displayed, the state is maintained in which the barrier is not formed.

On the other hand, the fixed barrier is in a state in which parallax images are constantly recognized as a stereoscopic image. Accordingly, in the stereoscopic image display device that can also display a planar image, in a case where the fixed barrier is used as the parallax barrier 20, two images having no parallax from each other are displayed on the image display unit as a right-eye image and a left-eye image when a planar image is displayed.

In the stereoscopic image display device 1 according to this embodiment, it is assumed that a variable barrier is used as the parallax barrier 20. In addition, as the variable barrier, a parallax barrier of the liquid crystal type in which a barrier (light shielding portion) is formed, for example, by using a liquid crystal is used. However, a case is not excluded in which a fixed barrier is used as the parallax barrier 20.

The parallax barrier 20 of the liquid crystal type includes two glass plates 21 and 22 and a liquid crystal layer 23 that is formed by sealing a liquid crystal material in a closed space formed between the glass plates 21 and 22. On one of the glass plates 21 and 22, transparent electrodes each having a stripe shape are formed at a constant interval along the arranging direction of the pixel row of the image display unit 10, that is, the vertical direction (the Y direction in the figure). A transparent common electrode is formed over an almost entire face of the other of the glass plates 21 and 22.

In the parallax barrier 20 of the liquid crystal type, when a voltage is applied between the transparent electrodes having the stripe shape and the transparent common electrode, the light shielding portions (barrier) 24 are formed at a constant interval in a stripe shape in accordance with the transparent electrodes each having the stripe shape. In FIG. 1, the light shielding portions 24 are hatched. Each area formed between the light shielding portions 24 each having the stripe shape forms a transmission portion 25. In FIG. 1, the transmission portions 25 are represented in white.

The parallax barrier 20 of the liquid crystal type having the above-described configuration is used in combination with the image display unit 10 and has the function as the optical component that enables stereoscopic recognition of parallax images displayed by the image display unit 10 as a stereoscopic image. In other words, by alternately forming the light shielding portion 24 having the stripe shape and the transmission portion 25 having the stripe shape at a constant interval by applying a voltage between the transparent electrodes each having the stripe shape and the transparent common electrode, the parallax images displayed by the image display unit 10 can be allowed to be recognized as a stereoscopic image (three-dimensional image) by an image observer.

To the contrary, when a voltage is not applied between the transparent electrodes each having the stripe shape and the transparent common electrode, a transmissive state (transmission portion) is formed over the entire face of the liquid crystal layer 23. In such a case, the parallax barrier 20 of the liquid crystal type does not achieve (does not have) the function as the optical component enabling the recognition of parallax images displayed on the image display unit 10 to be stereoscopically recognized. Accordingly, when a voltage is not applied between the transparent electrodes each having the stripe shape and the transparent common electrode, not the display of a stereoscopic image but the display of an ordinary planar image (two-dimensional image) is performed.

Figure 2:
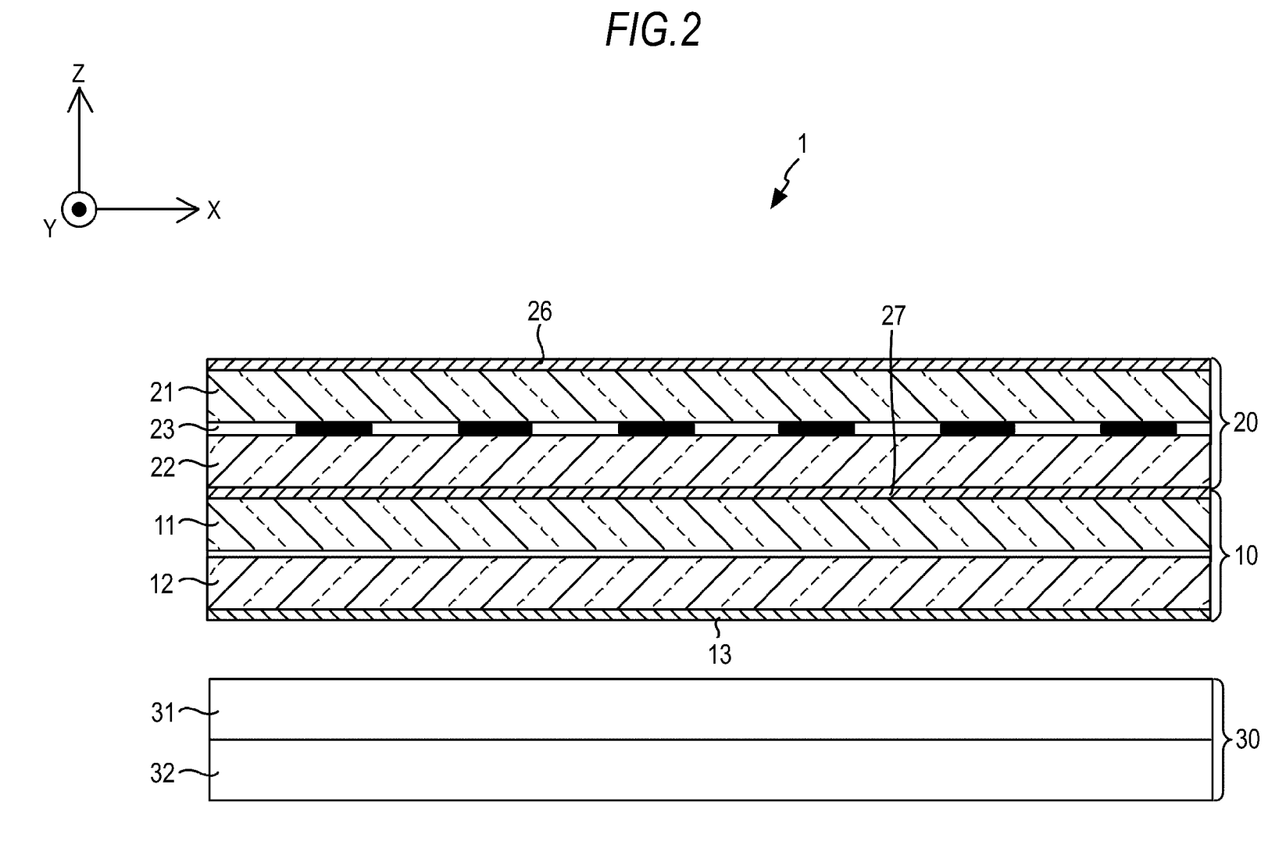
FIG. 2 is a plane sectional view of a stereoscopic image display device according to an embodiment.

FIG. 2 is a plane sectional view of the stereoscopic image display device 1 according to the embodiment. As illustrated in FIG. 2, in the image display unit 10 that is formed by the liquid crystal display panel, a polarizing plate 13 is arranged on the rear face of the image display unit 10, that is, a side of the rear panel 12 that is located on the back light unit 30. In addition, in the parallax barrier 20 of the liquid crystal type, polarizing plates 26 and 27 are arranged on a face of the glass plate 21 that is located on the display surface side and a face of the glass plate 22 that is located on the image display unit 10 side, respectively.

(Principle of Parallax Barrier Type)

Here, the principle of the parallax barrier type will be described. As examples of the parallax barrier type, there are a two-parallax (two-eye) type, a multi-parallax type having four or more parallaxes (four-eye), a step barrier type, and the like. Here, the overview of the principle of the parallax barrier type will be described with reference to FIGS. 3A and 3B in the case of the two-parallax type as an example.

Figure 3A:
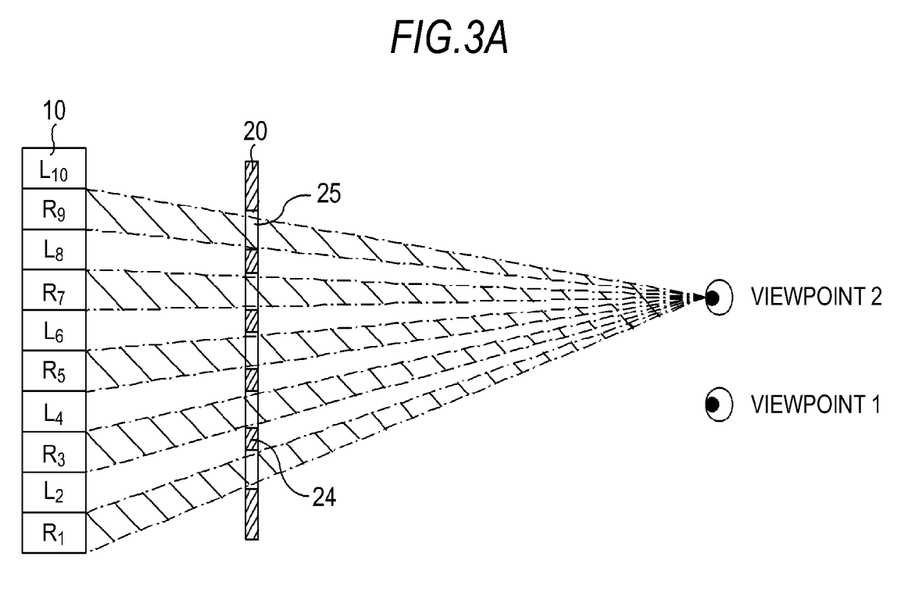
FIGS. 3A and 3B are schematic diagrams illustrating the principle of a parallax barrier type in the case of two parallaxes.
Figure 3B:
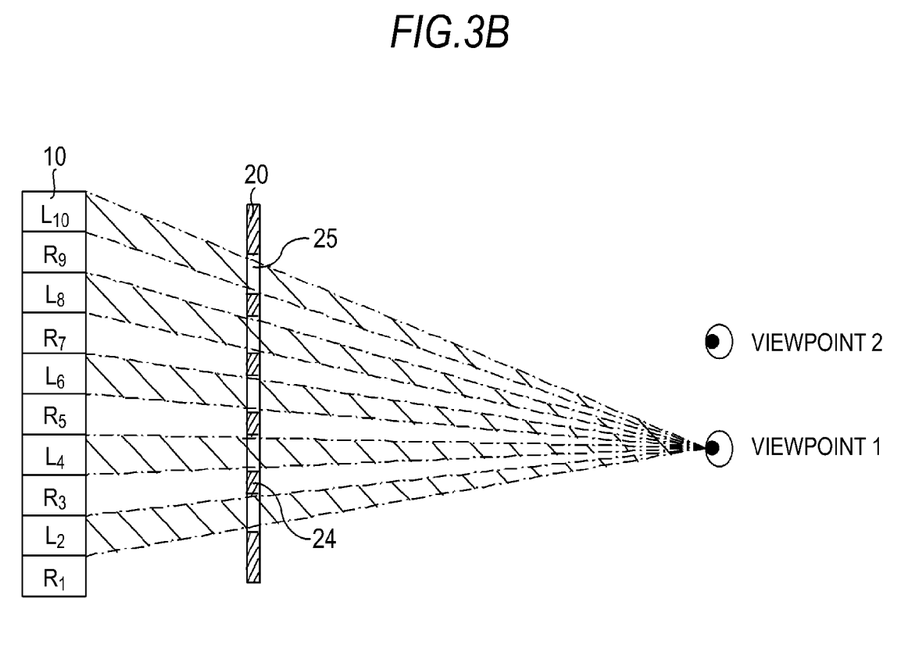

In the pixel arrangement, which has a matrix pattern, of the image display unit 10, pixels are classified into right-eye pixel groups $R_1, R_3, R_5, R_7$, and $R_9$ displaying right-eye images and left-eye pixel groups $L_2, L_4, L_6, L_8$, and $L_{10}$ displaying left-eye images in units of pixel columns. In other words, the pixels have the pixel arrangement in which pixel columns of the right-eye pixel groups $R_1, R_3, R_5, R_7$, and $R_9$ and pixel columns of the left-eye pixel groups $L_2, L_4, L_6, L_8$, and $L_{10}$ are alternately arranged.

Right-eye video signals are supplied to the right-eye pixel groups $R_1, R_3, R_5, R_7$, and $R_9$ from a right-eye signal source in units of pixel columns, and left-eye video signals are supplied to the left-eye pixel groups $L_2, L_4, L_6, L_8$, and $L_{10}$ from a left-eye signal source in units of pixel columns. Accordingly, two images including a right-eye image and a left-eye image, in other words, parallax images can be displayed on the image display unit 10.

In the state in which the parallax images are displayed on the image display unit 10, as illustrated in FIG. 3A, light beam groups emitted from the right-eye pixel groups $R_1, R_3, R_5, R_7$, and $R_9$ arrive at view point 2 through the transmission portions 25 of the parallax barrier 20. In addition, as illustrated in FIG. 3B, light beam groups emitted from the left-eye pixel groups $L_2, L_4, L_6, L_8$, and $L_{10}$ arrive at view point 1 through the transmission portions 25 of the parallax barrier 20.

In this way, at a position arranged at a predetermined distance from the display surface of the image display unit 10, an image at viewpoint 1 and an image at view point 2 are independently observed. In other words, the left eye and the right eye of an image observer are located at view point 1 and view point 2. Described in another way, by image observer's observing parallax images at a position that is arranged at a predetermined distance from the display surface of the image display unit 10, the parallax images displayed by the image display unit 10 are incident on the left and right eyes of the image observer as a left-eye image and a right-eye image. As a result, binocular parallax occurs, and the image observer can observe (recognize) the parallax images displayed on the image display unit 10 to be stereoscopic, in other words, as a stereoscopic image.

(Back Light Unit)

As illustrated in FIG. 1, the back light unit 30 is formed by two illumination sections, that is, the first illumination section 31 and the second illumination section 32. The first illumination section 31 and the second illumination section 32 include independent light sources 33 and 34. The light sources 33 and 34 are not particularly limited. As the light sources 33 and 34, general members such as LEDs or cold cathode ray tubes can be used. The LEDs are light sources having a broad color reproduction gamut.

The first illumination section 31 illuminates over the entire face of the image display unit 10 from the rear face side at a first outgoing angle based on light emitted from the light source 33. The second illumination section 32 that is arranged on the image display unit 10 side of the first illumination section 31 illuminates the image display unit 10 from the rear face side in the horizontal direction (direction X in the figure) of the display screen at a second outgoing angle that is narrower than the first outgoing angle based on light emitted from the light source 34.

Figure 4:
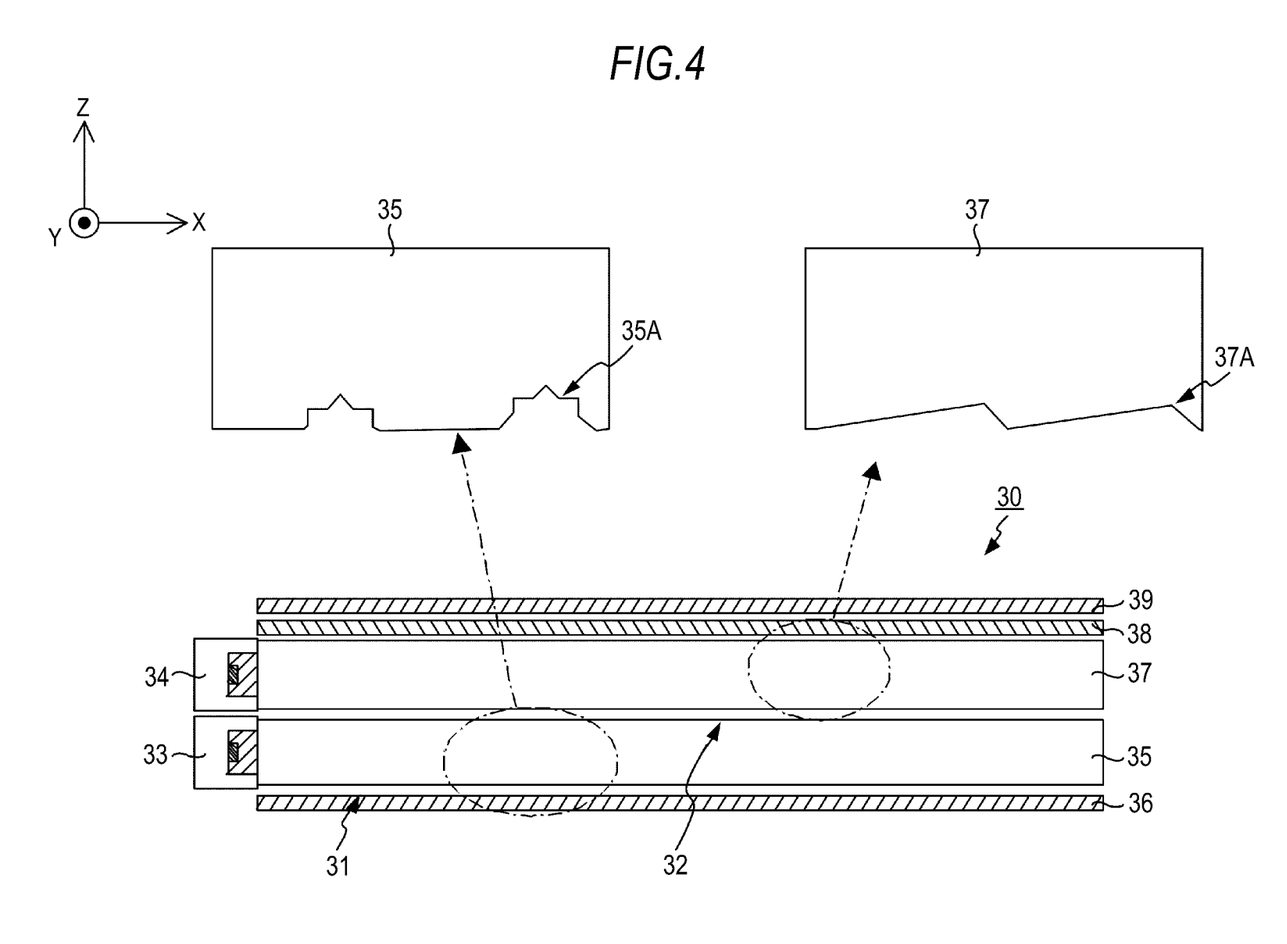
FIG. 4 is a plane sectional view illustrating an example of the configuration of a back light unit.

FIG. 4 is a plane sectional view illustrating an example of the configuration of the back light unit 30.

The first illumination section 31 is configured by using a light guiding plate 35 formed from an acrylic material having a size (area) that is about the same as the image display unit 10. A reflective film 36 is disposed on a side of the light guiding plate 35 that is opposite to the image display unit 10. In order to achieve high luminance and low power consumption, the reflective film 36 performs an action of efficiently reflecting the light transmitted from the light source 33 to the light guiding plate 35 side. As the reflective film 36, for example, a film having a multi-layer structure using a polyester-based resin can be used.

The light guiding plate 35 includes reflective dots having diffusibility or a scattering member such as a prism or the like on an inner face located on the side opposite to the image display unit 10. In the case of this example, a part of the light guiding plate 35 is illustrated in FIG. 4 in an enlarged scale, a configuration is employed in which a prism having a polyhedron shape protruding from the inner face of the light guiding plate 35 that is located on the side opposite to the image display unit 10 to the inside as the scattering member $35_A$ is used.

The configuration of the scattering member 37 described here is merely an example and is not limited to a prism having a polyhedron shape. As the scattering member $35_A$, for example, a reflective dot (for example, a white dot) having diffusibility may be used. The scattering members $35_A$ are irregularly arranged over the entire inner face that is located on the side opposite to the image display unit 10. However, it is not excluded to regularly arrange the scattering members $35_A$.

The distribution and the like of the light emitted from the light guiding plate 35 are determined based on the arrangement density of the scattering member $35_A$, the height (depth) of the shape, and the like of the scattering member $35_A$. Regarding the arrangement density of the scattering member $35_A$, it is preferable that the scattering members $35_A$ are arranged such that the density increases as the distance from the light source 33 increases. Alternatively, regarding the height of the shape of the scattering member $35_A$, it is preferable that the scattering members $35_A$ are formed such that the height (depth) of the shape increases as the distance from the light source 33 increases.

In addition, it is more preferable that the above-described configurations relating to the arrangement density and the height of the shape of the scattering members $35_A$ are combined together. However, it is not excluded to employ each single configuration.

As the distance from the light source 33 increases, the intensity of arrived light decreases. In contrast to this, in a case where the arrangement density of the scattering member $35_A$ increases as the distance from the light source 33 increases, light is scattered more as that much. Accordingly, scattering light having an approximately uniform light intensity over the entire light guiding plate 35 regardless of the distance from the light source 33 can be acquired. Alternatively, in a case where the height of the shape of the scattering member $35_A$ increases as the distance from the light source 33 increases, an area to which light is emitted increases. Accordingly, scattering light having an approximately uniform light intensity over the entire light guiding plate 35 can be acquired regardless of the distance from the light source 33.

Incidentally, in a case where reflective dots are used as the scattering members $35_A$, it is preferable that the area of the reflective dot is formed so as to increase as the distance from the light source 33 increases. In such a case, as the distance from the light source 33 increases, the area of the scattering member $35_A$ to which light is emitted increases. Accordingly, the scattering light having an approximately uniform light intensity over the entire light guiding plate 35 regardless of the distance from the light source 33 can be acquired.

The second illumination section 32 is configured by using a light guiding plate 37 that is formed from an acrylic material having an approximately same size (area) as the light guiding plate 35 of the first illumination section 31. On the image display unit 10 side of the light guiding plate 37, a prism film (prism sheet) 38 and a diffusion film 39 are arranged in the mentioned order.

The light guiding plate 37 includes a prism $37_A$ having an inclined face that rises at a predetermined angle (inclined angle) as the distance from the light source 34 increases on the inner face that is located on the side opposite to the image display unit 10. This prism $37_A$ is formed in a band shape along the pixel arranging direction (direction Y in the figure) of the pixel column of the image display unit 10. In addition, the prisms $37_A$ each having the band shape are arranged at a constant interval in the pixel arranging direction (direction X in the figure) of the pixel row of the image display unit 10. The distribution and the like of light emitted from the light guiding plate 37 are determined based on the inclined angle of the inclined face, the arrangement interval, and the like of the prism $37_A$.

The prism film 38 is an optical deflection device that is formed from a light transmitting member having a sheet shape and is used for the purpose of improving the luminance viewed in the visible direction by improving the optical efficiency of the back light unit 30. The diffusion film 39 performs an action of emitting light output from the light guiding plate 35 over the entire face of the image display unit 10. As the base film of the diffusion film 39, a general film such as a PET film having superior optical characteristics can be used.

The operations of the first illumination section 31 and the second illumination section 32 of the back light unit 30 having the above-described configuration will be described.

First, in the first illumination section 31, the light emitted from the light source 33 is incident on the inside of light guiding plate 35 from the side face. The light incident on the inside of the light guiding plate 35 repeats to be totally reflected so as to spread inside the light guiding plate 35. At this time, since the scattering members $35_A$ each having a polyhedron shape are present on the inner side of the light guiding plate 35 that is located on the side opposite to the image display unit 10, light is scattered by the scattering members $35_A$, and the scattered light outputs from the light guiding plate 35 to the image display unit 10 side. Then, the scattered light output from the light guiding plate 35 passes through the prism film 38 and then is diffused by the diffusion film 39 so as to illuminate the image display unit 10 from the rear face side as light having a broad angle range (light at the first outgoing angle).

Next, in the second illumination section 32, the light emitted from the light source 34 is incident on the inside of the light guiding plate 37 from the side face. The light incident on the inside of the light guiding plate 37 repeats to be totally reflected so as to spread inside the light guiding plate 37. In the process of repeating the total reflection, light comes out of the light guiding plate 37 due to a small outgoing angle by not satisfying the conditions of total reflection. At this time, the angle of light output from the light guiding plate 37, that is, the outgoing angle is almost constant. Then, the light output from the light guiding plate 37 at a small outgoing angle that is almost constant passes through the prism film 38, whereby the light is emitted to the image display unit 10 from the rear face side as light having a narrow angle distribution (light at the second outgoing angle).

In the above-described stereoscopic image display device 1 according to the embodiment, the back light unit 30 can selectively perform the illumination of the image display unit through the first illumination section 31 and the illumination of the image display unit 10 through the second illumination section 32. More specifically, when a planar image is displayed, the first illumination section 31 of the first outgoing angle is used, and, when a stereoscopic image is displayed, the second illumination section 32 of the second outgoing angle narrower than the first outgoing angle is used.

As above, at the time of displaying a stereoscopic image, by forming the outgoing angle of light emitted from the back light unit 30 to be narrower than that at the time of displaying a planar image, the viewing angle of the image display unit 10 is narrowed, and accordingly, the angle range in which an image observer observes (views) the display screen through the image display unit 10 is narrowed. Accordingly, the influence of the reverse view can be suppressed, whereby the visibility can be improved. In addition, since the light intensity of illumination for the image display unit 10 can be increased due to the narrow angle of light of the back light unit, the light intensity of illumination for the image display unit 10 can be increased, and accordingly, even in a case where the parallax barrier 20 is interposed in the optical path between the image display unit 10 and an image observer, a luminance level that is higher than that of a case where the first illumination section 31 is used can be acquired.

Here, regarding the luminance and the efficiency at the time of viewing the display screen on the front side, the test results at the time of displaying a planar image and at the time of displaying a stereoscopic image under the following conditions will be compared. Here, a general back light unit (corresponding to the back light unit 30 at the time of using the first illumination section 31) and the back light unit 30 according to the embodiment will be compared. In addition, the size of the general back light unit is configured to be 3.5 [inches], and the size of the back light unit 30 according to the embodiment is configured to be 3.0 [inches].

Then, when the outgoing angle of light of the back light unit at the time of displaying a planar image (2D) is configured to be 46 degrees, in the case of the general back light unit, a test result of luminance of 1500 [nit], power consumption of 490 [mW], and the efficiency of 0.38 [nit/mW lumen] was acquired. In contrast to this, in the case of the back light unit 30 according to the embodiment, a test result of luminance of 8000 [nit], power consumption of 399 [mW], and efficiency of 0.38 [nit/mW lumen] was acquired.

In addition, at the time of displaying a stereoscopic image (3D), the outgoing angle of light of the general back light unit was 46 degrees, which is the same as that at the time of displaying a planar image, and the outgoing angle of light of the back light unit 30 according to the embodiment was 20 degrees, which is less than a half of that of the general back light unit.

Under such conditions, in the case of the general back light unit, a test result of luminance of 1500 [nit], power consumption of 490 [mW], and efficiency of 0.38 [nit/mW lumen] was acquired. In contrast to this, in the case of the back light unit 30 according to the embodiment, a test result of luminance of 4000 [nit], power consumption of 126 [mW], and efficiency of 0.57 [nit/mW lumen] was acquired.

As is apparent from the comparison of the test results under the above-described conditions, according to the back light unit 30 of the embodiment, by narrowing the outgoing angle of light of the back light unit at the time of displaying a stereoscopic image, the luminance that is 2.7 times that of the general back light unit and the efficiency that is 1.5 times that of the general back light unit can be acquired.

(Driving Circuit)

Next, the driving circuit of the stereoscopic image display device 1 according to this embodiment will be described.

Figure 5:
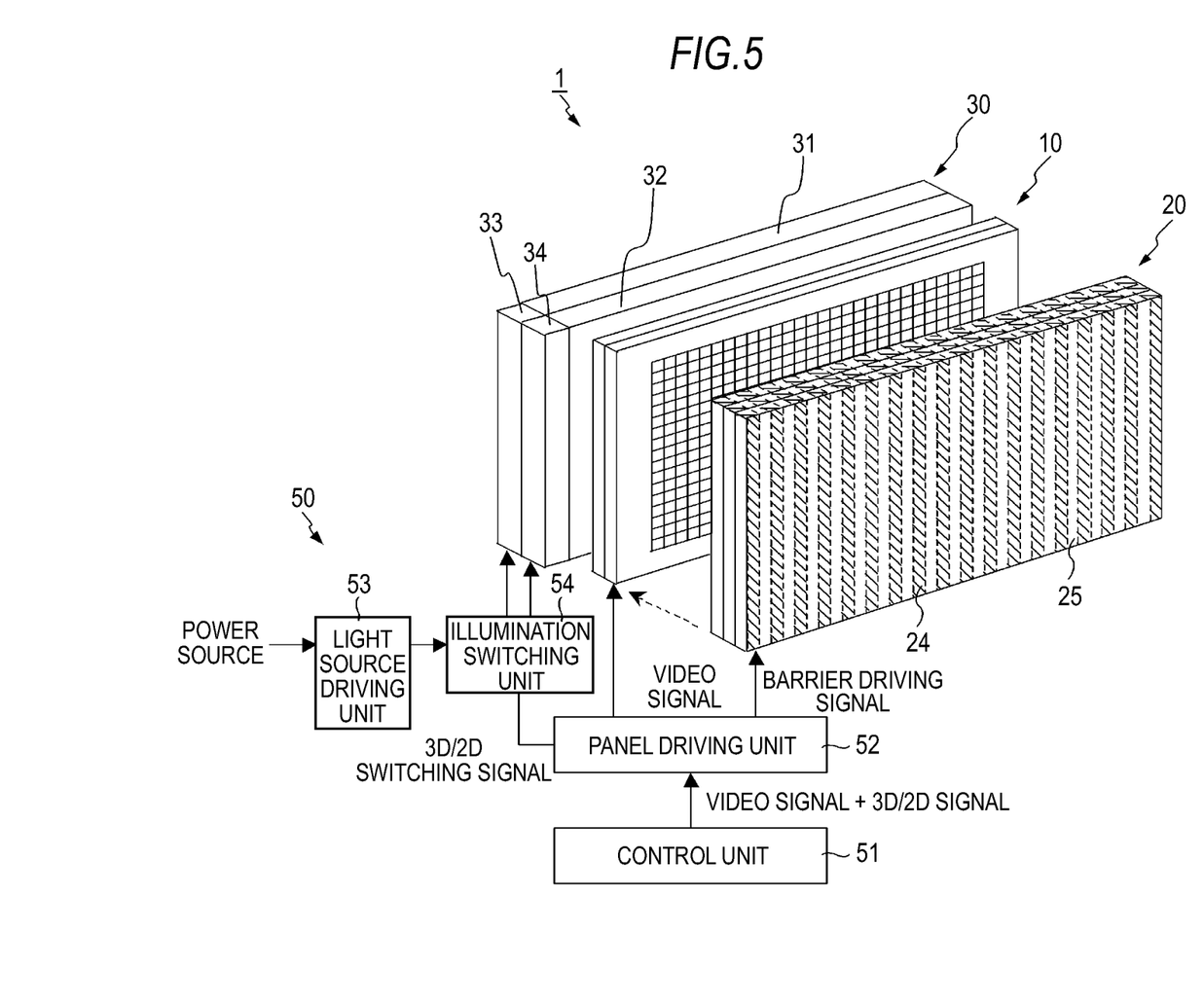
FIG. 5 is a block diagram illustrating an example of the configuration of a driving circuit of a stereoscopic image display device according to an embodiment.

FIG. 5 is a block diagram illustrating an example of the configuration of the driving circuit of the stereoscopic image display device 1 according to the embodiment.

As illustrated in FIG. 5, the driving circuit 50 according to this configuration example is configured so as to include a control unit 51, a panel driving unit 52, a light source driving unit 53, and an illumination switching unit 54. The control unit 51, for example, is configured by a DSP (Digital Signal Processor) and transmits a video signal and a 3D/2D signal to the panel driving unit 52. Here, the "3D/2D signal" is a signal that indicates either the display of a stereoscopic image or the display of a planar image. The panel driving unit 52, the light source driving unit 53, and the illumination switching unit 54 can be configured by using general circuit devices or the like.

The panel driving unit 52 receives the video signal and the 3D/2D signal, supplies the video signal to the image display unit 10, and supplies a barrier driving signal that directs barrier On or barrier Off based on the 3D/2D signal to the parallax barrier 20. Here, the "barrier On" represents the formation of the light shielding portions (barrier) 24 in the parallax barrier 20. On the other hand, the "barrier Off" represents no formation of the light shielding portions 24 in the parallax barrier 20, in other words, making the entire face of the parallax barrier 20 to be in the transmission state.

In addition, the panel driving unit 52 receives the video signal and the 3D/2D signal and transmits a switching signal for switching between the first illumination section 31 and the second illumination section 32 of the back light unit 30, that is, the 2D/3D switching signal to the illumination switching unit 54. The light source driving unit 53 supplies power used for driving the light sources 33 and 34 of the back light unit 30 to the illumination switching unit 54.

The illumination switching unit 54 receives the 2D/3D switching signal and performs a control operation for switching between the first illumination section 31 and the second illumination section 32 of the back light unit 30. More specifically, the illumination switching unit 54 performs gentle switching from the first illumination section 31 to the second illumination section 32 or switching from the second illumination section 32 to the first illumination section 31 over a predetermined time after switching from the planar image to the stereoscopic image or switching from the stereoscopic image to the planar image.

Figure 6A:
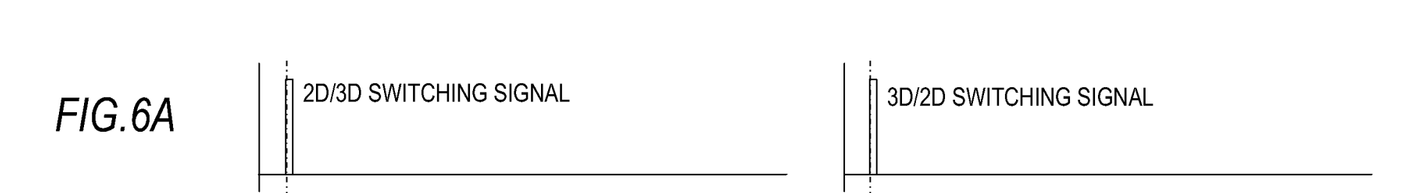
FIGS. 6A to 6D are diagrams illustrating the control process performed when switching between a first illumination section and a second illumination section is performed.
Figures 6B, 6C:
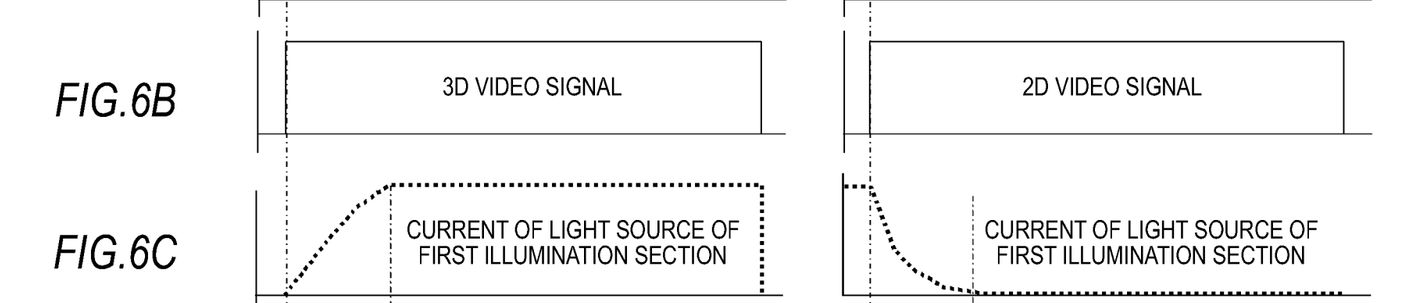
Figure 6D:
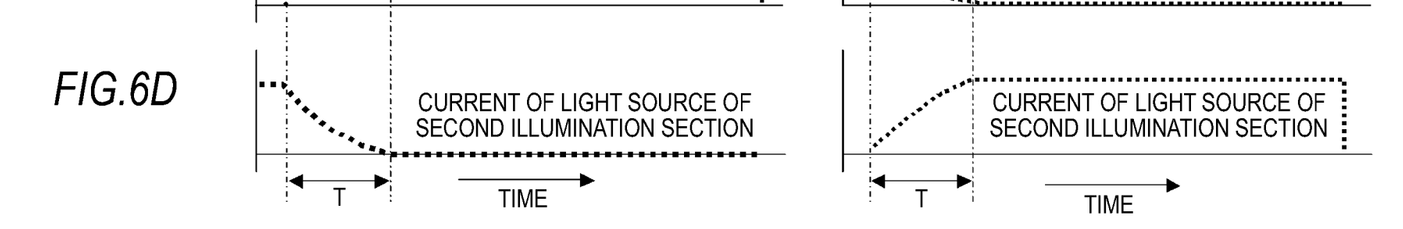

FIGS. 6A to 6D are diagrams illustrating the control process performed when switching between the first illumination section 31 and the second illumination section 32 is performed. FIG. 6A illustrates a 2D/3D switching signal, FIG. 6B illustrates a 3D/2D switching signal, FIG. 6C illustrate a current of the light source 33 of the first illumination section 31, and FIG. 6D illustrates a current of the light source 34 of the second illumination section 32.

Here, as the above-described predetermined time, that is, a time T from the start time point of the rising/falling of the current of the light sources 33 and 34 to the end time point of the rising/falling, for example, a time corresponding a predetermined number of frames, for example, about three to four frames is preferable.

As above, by gently performing the switching between the first illumination section 31 and the second illumination section 32 over the predetermined time T after the switching between a planar image and a stereoscopic image, an abrupt change in the luminance accompanied with the switching between the first illumination section 31 and the second illumination section 32 can be suppressed. Accordingly, the switching between the first illumination section 31 and the second illumination section 32 can be performed without incurring a sense of discomfort to an image observer.

The present disclosure may be implemented as the following configurations.

(1) A stereoscopic image display device including: an image display unit that can display parallax images; an optical component that causes the parallax images to be recognized as a stereoscopic image; and a back light unit that is arranged on a rear face side of the image display unit, wherein the back light unit includes a first illumination section that illuminates the image display unit at a first outgoing angle at the time of displaying a planar image by using the image display unit and a second illumination section that illuminates the image display unit at a second outgoing angle, which is narrower than the first outgoing angle, at the time of displaying a stereoscopic image by using the image display unit and the optical component.

(2) The stereoscopic image display device described in (1), wherein the second outgoing angle is an angle of a pixel row of the image display unit in a pixel arranging direction.

(3) The stereoscopic image display device described in (1), wherein the optical component is a parallax barrier.

(4) The stereoscopic image display device described in (3), wherein the parallax barrier is a variable barrier that selectively forms a barrier.

(5) The stereoscopic image display device described in (4), wherein the variable barrier selectively forms the barrier by using a liquid crystal.

(6) The stereoscopic image display device described in any one of (1) to (5), wherein the second illumination section is disposed further on the image display unit side than the first illumination unit.

(7) The stereoscopic image display device described in any one of (1) to (6), wherein switching from the first illumination section to the second illumination section or switching from the second illumination section to the first illumination section is performed over a predetermined time after switching from the display of a planar image to the display of a stereoscopic image or switching from the display of a stereoscopic image to the display of a planar image.

(8) The stereoscopic image display device described in (7), wherein the predetermined time is a time corresponding to a predetermined number of frames.

(9) A method of driving a stereoscopic image display device including an image display unit that can display parallax images, an optical component that causes the parallax images to be recognized as a stereoscopic image, and a back light unit that is arranged on a rear face side of the image display unit, wherein the back light unit including a first illumination section that illuminates the image display unit at a first outgoing angle and a second illumination section that illuminates the image display unit at a second outgoing angle that is narrower than the first outgoing angle, the method including switching between the first illumination section and the second illumination section at the time of displaying a planar image by using the image display unit and at the time of displaying a stereoscopic image by using the image display unit and the optical component.

The present disclosure contains subject matter related to that disclosed in Japanese Priority Patent Application JP 2011-137087 filed in the Japan Patent Office on Jun. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic image display device comprising:
an image display unit that can display parallax images and a planar image, the parallax images including a plurality of images each of which has a parallax, the image display unit displaying the plurality of images simultaneously to display a stereoscopic image and not displaying the planar image during the time of displaying the stereoscopic image;
an optical component that causes the parallax images to be recognized as a stereoscopic image; and
a back light unit that is arranged on a rear face side of the image display unit, wherein the back light unit includes
a first illumination section that illuminates the image display unit at a first outgoing angle at the time of displaying the planar image by using the image display unit and
a second illumination section that illuminates the image display unit at a second outgoing angle, which is narrower than the first outgoing angle, continuously during the time of displaying the stereoscopic image by using the image display unit and the optical component.

2. The stereoscopic image display device according to claim 1, wherein the second outgoing angle is an angle of a pixel row of the image display unit in a pixel arranging direction.

3. The stereoscopic image display device according to claim 1, wherein the optical component is a parallax barrier.

4. The stereoscopic image display device according to claim 3, wherein the parallax barrier is a variable barrier that selectively forms a barrier.

5. The stereoscopic image display device according to claim 4, wherein the variable barrier selectively forms the barrier by using a liquid crystal.

6. The stereoscopic image display device according to claim 1, wherein the second illumination section is disposed further on the image display unit side than the first illumination section.

7. The stereoscopic image display device according to claim 1, wherein switching from the first illumination section to the second illumination section or switching from the second illumination section to the first illumination section is performed over a predetermined time after switching from the display of the planar image to the display of the stereoscopic image or switching from the display of the stereoscopic image to the display of the planar image.

8. The stereoscopic image display device according to claim 7, wherein the predetermined time is a time corresponding to a predetermined number of frames.

9. A method of driving a stereoscopic image display device that includes
an image display unit that can display parallax images and a planar image, the parallax images including a plurality of images each of which has a parallax, the image display unit displaying the plurality of images simultaneously to display a stereoscopic image and not displaying the planar image during the time of displaying the stereoscopic image, an optical component that causes the parallax images to be recognized as a stereoscopic image, and a back light unit that is arranged on a rear face side of the image display unit, the back light unit including a first illumination section that illuminates the image display unit at a first outgoing angle at the time of displaying the planar image by using the image display unit and a second illumination section that illuminates the image display unit at a second outgoing angle, which is narrower than the first outgoing angle, continuously during the time of displaying the stereoscopic image by using the image display unit and the optical component, the method comprising:

switching between the first illumination section and the second illumination section at the time of displaying the planar image by using the image display unit and at the time of displaying the stereoscopic image by using the image display unit and the optical component.

* * * * *